US009478792B2

(12) United States Patent
Lee

(10) Patent No.: US 9,478,792 B2
(45) Date of Patent: Oct. 25, 2016

(54) ELECTRODE ASSEMBLY, AND RECHARGEABLE BATTERY

(71) Applicant: SAMSUNG SDI CO., LTD., Yongin-si, Gyeonggi-do (KR)

(72) Inventor: Hyung-Dong Lee, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 98 days.

(21) Appl. No.: 14/244,416

(22) Filed: Apr. 3, 2014

(65) Prior Publication Data

US 2015/0030920 A1    Jan. 29, 2015

Related U.S. Application Data

(60) Provisional application No. 61/858,826, filed on Jul. 26, 2013.

(51) Int. Cl.
*H01M 4/64* (2006.01)
*H01M 4/04* (2006.01)
*H01M 10/04* (2006.01)
*H01M 10/0587* (2010.01)
*H01M 2/26* (2006.01)
*H01M 2/34* (2006.01)
*H01M 10/052* (2010.01)

(52) U.S. Cl.
CPC ......... *H01M 4/043* (2013.01); *H01M 10/0431* (2013.01); *H01M 10/0587* (2013.01); *H01M 2/26* (2013.01); *H01M 2/347* (2013.01); *H01M 10/052* (2013.01); *Y02T 10/7011* (2013.01); *Y10T 29/49108* (2015.01)

(58) Field of Classification Search
CPC ......... H01M 10/0431; H01M 10/052; H01M 10/0587; H01M 2/26; H01M 2/347; H01M 4/043

See application file for complete search history.

(56) References Cited

U.S. PATENT DOCUMENTS

2003/0099879 A1    5/2003    Lee
2005/0260491 A1    11/2005   Cho
(Continued)

FOREIGN PATENT DOCUMENTS

JP    11-026009 A       1/1999
JP    2007-324074 A    12/2007
KR    10-2008-0022914 A    3/2008

OTHER PUBLICATIONS

Search Report mailed Nov. 21, 2014 in corresponding European Patent Application No. 14166052.2.

*Primary Examiner* — Carlos Barcena
(74) *Attorney, Agent, or Firm* — Lee & Morse, P.C.

(57) ABSTRACT

An electrode assembly includes an electrode stack that includes a positive electrode, a negative electrode, and a separator, the separator being interposed between the positive electrode and the negative electrode, a positive electrode tab projecting from an edge of the electrode stack, and a negative electrode tab projecting from an edge of the electrode stack. The electrode stack may have a height direction, a width direction, and a thickness direction, the thickness direction being substantially perpendicular to a plane that includes the height and width directions, the electrode stack having a first thickness in the thickness direction at a first location corresponding to at least one of the positive and negative electrode tabs, the electrode stack having a second thickness in the thickness direction at a second location peripheral to the first location, the first thickness being greater than the second thickness.

14 Claims, 20 Drawing Sheets

(56) References Cited

U.S. PATENT DOCUMENTS

2006/0115729 A1* 6/2006 Lee .................. H01M 2/26 429/211

2007/0026307 A1* 2/2007 Kim .................. H01M 2/263 429/161

* cited by examiner

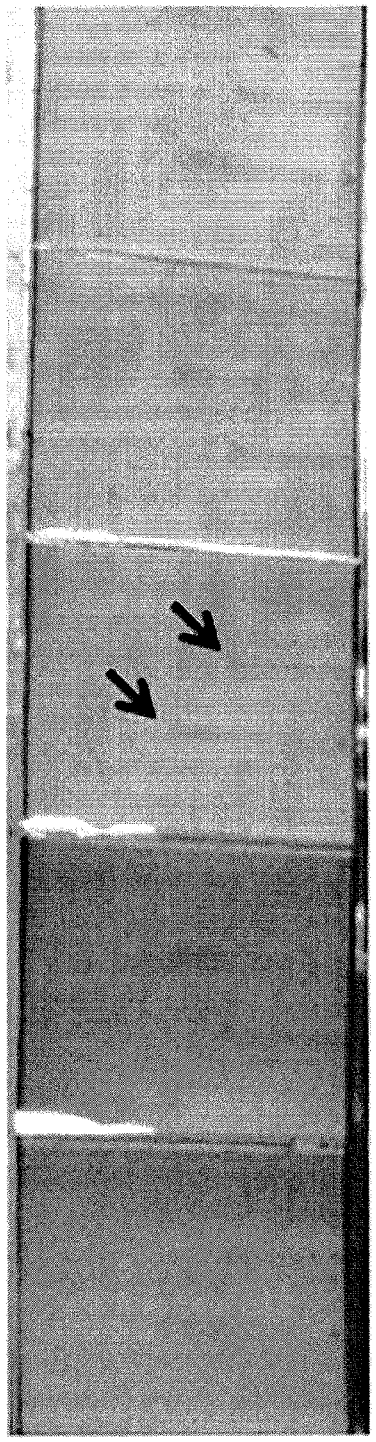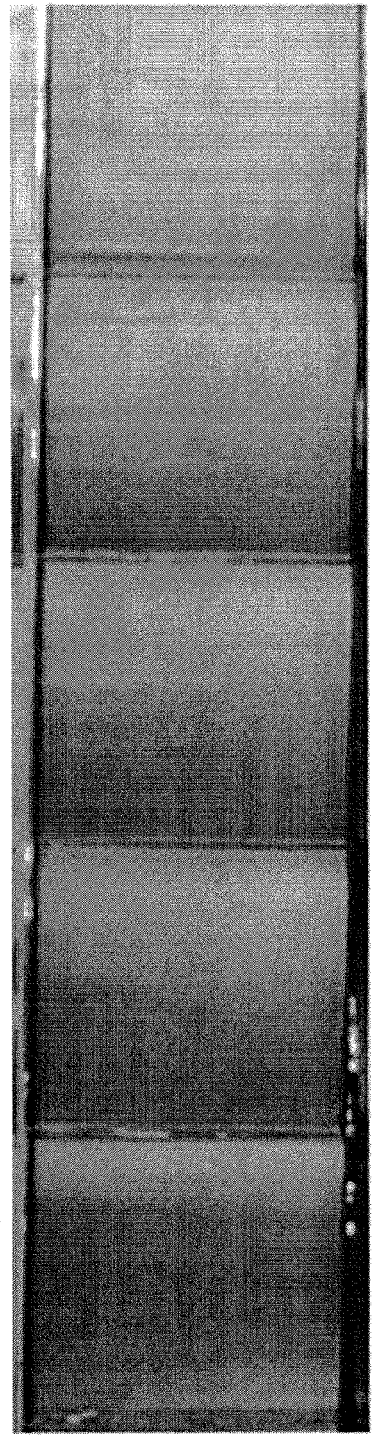
FIG. 7A
FIG. 7B

ELECTRODE ASSEMBLY, AND RECHARGEABLE BATTERY

CROSS-REFERENCE TO RELATED APPLICATION

This application claims priority to U.S. Provisional Application No. 61/858,826, filed in the U.S. Patent and Trademark Office on Jul. 26, 2013, and entitled "Electrode Assembly, and Rechargeable Battery," which is hereby incorporated by reference herein in its entirety for all purposes.

BACKGROUND

1. Field

Embodiments relate to an electrode assembly and a rechargeable battery.

2. Description of the Related Art

Rechargeable batteries may be repeatedly charged and discharged. Low-capacity rechargeable batteries may be used for small portable electronic devices such as mobile phones, laptop computers, and camcorders, and large-capacity rechargeable batteries may be used as power supplies for driving motors for hybrid vehicle or the like.

Large-capacity and high-power rechargeable batteries using a non-aqueous electrolyte with high energy density have been developed. The high-power rechargeable batteries may be configured as high-power/large-capacity battery modules coupled to each other in series or in parallel.

The above information disclosed in this Background section is only for enhancement of understanding of the background of the described technology and therefore it may contain information that does not form the prior art that is already known in this country to a person of ordinary skill in the art.

SUMMARY

Embodiments are directed to an electrode assembly, including an electrode stack that includes a positive electrode, a negative electrode, and a separator, the separator being interposed between the positive electrode and the negative electrode, a positive electrode tab projecting from an edge of the electrode stack, and a negative electrode tab projecting from an edge of the electrode stack. The electrode stack may have a height direction, a width direction, and a thickness direction, the thickness direction being substantially perpendicular to a plane that includes the height and width directions, the electrode stack having a first thickness in the thickness direction at a first location corresponding to at least one of the positive and negative electrode tabs, the electrode stack having a second thickness in the thickness direction at a second location peripheral to the first location, the first thickness being greater than the second thickness.

The second location may be approximately midway between the first location and an edge of the electrode stack.

The electrode stack may have a first edge and a second edge, the first and second edges being spaced apart in the height direction, the positive and negative electrode tabs may project from the first edge, and the electrode stack may have the first thickness from substantially the first edge to the second edge.

The electrode stack may have a first edge and a second edge, the first and second edges being spaced apart in the height direction, the positive and negative electrode tabs may project from the first edge, the electrode stack may have the first thickness from substantially the first edge to a first position between the first and second edges, and the electrode stack may have the second thickness from the first position to the second edge.

The electrode assembly may have a pressing region and non-pressing region, the second location being in the pressing region, the first location being in the non-pressing region, the pressing region being compressed so as to have a thickness that is less than that of the non-pressing region, the non-pressing region corresponding to at least one of the positive and negative electrode tabs.

The electrode assembly may have a first edge and second edge opposite to the first edge, and have opposing third and fourth edges that connect the first and second edges, the positive electrode tab projecting from the first edge, the negative electrode tab projecting from the second edge, and the pressing region may include substantially all of the third and fourth edges.

The electrode assembly may have a first edge and second edge opposite to the first edge, and have opposing third and fourth edges that connect the first and second edges, the positive and negative electrode tabs projecting from the first edge, and the pressing region may include substantially all of the second, third, and fourth edges.

The electrode assembly may have a first edge and second edge opposite to the first edge, and have opposing third and fourth edges that connect the first and second edges, the positive and negative electrode tabs projecting from the first edge, and the pressing region may include substantially all of the third and fourth edges.

Embodiments are also directed to a rechargeable battery including an electrode assembly according to an embodiment.

Embodiments are also directed to an electrode assembly, including an electrode stack that includes a positive electrode, a negative electrode, and a separator, the separator being interposed between the positive electrode and the negative electrode, a positive electrode tab projecting from an edge of the electrode stack, and a negative electrode tab projecting from an edge of the electrode stack. The electrode stack may have a greater thickness in a region overlying the electrode tabs than in a region peripheral to the electrode tabs.

Embodiments are also directed to a method of manufacturing an electrode assembly, the method including providing an electrode stack that includes a positive electrode, a negative electrode, and a separator, the separator being interposed between the positive electrode and the negative electrode, a positive electrode tab projecting from an edge of the electrode stack, a negative electrode tab projecting from an edge of the electrode stack, and pressing the electrode stack in a second region that excludes a first region corresponding to at least one of the positive and negative electrode tabs so as to reduce a thickness of the electrode stack except in the first region.

Pressing the electrode stack may include applying pressure to the electrode stack using a pressing plate that has a slit part aligned with the at least one of the positive and negative electrode tabs.

The pressing plate may include a first pressing plate provided at a first side of the electrode stack and a second pressing plate provided at a second side of the electrode stack, such that the electrode stack is between the first and second pressing plates, and the first and second pressing plates may each include a plurality of parts spaced apart by a slit part, the slit parts each overlapping an edge of the electrode stack, at least one of the positive and negative electrode tabs projecting from an edge of the electrode stack in a region corresponding to a slit part.

The positive and negative electrode tabs may each project from a same edge of the electrode stack.

The positive and negative electrode tabs may project from opposite edges of the electrode stack.

The pressing plate may include a first pressing plate provided at a first side of the electrode stack and a second pressing plate provided at a second side of the electrode stack, such that the electrode stack is between the first and second pressing plates, and the first and second pressing plates may each be formed as a continuous plate that overlaps substantially all of a side of the electrode stack except for an open region formed by the slit part, the positive and negative electrode tabs each projecting from a same edge of the electrode stack in a region corresponding to the slit parts.

BRIEF DESCRIPTION OF THE DRAWINGS

Features will become apparent to those of skill in the art by describing in detail example embodiments with reference to the attached drawings in which:

FIG. 7A is an image showing a surface of the electrode assembly thermo-compressed in a scheme according to a comparative example, and FIG. 7B is an image showing a surface of an electrode assembly according to an example embodiment.

DETAILED DESCRIPTION

Figure 1:
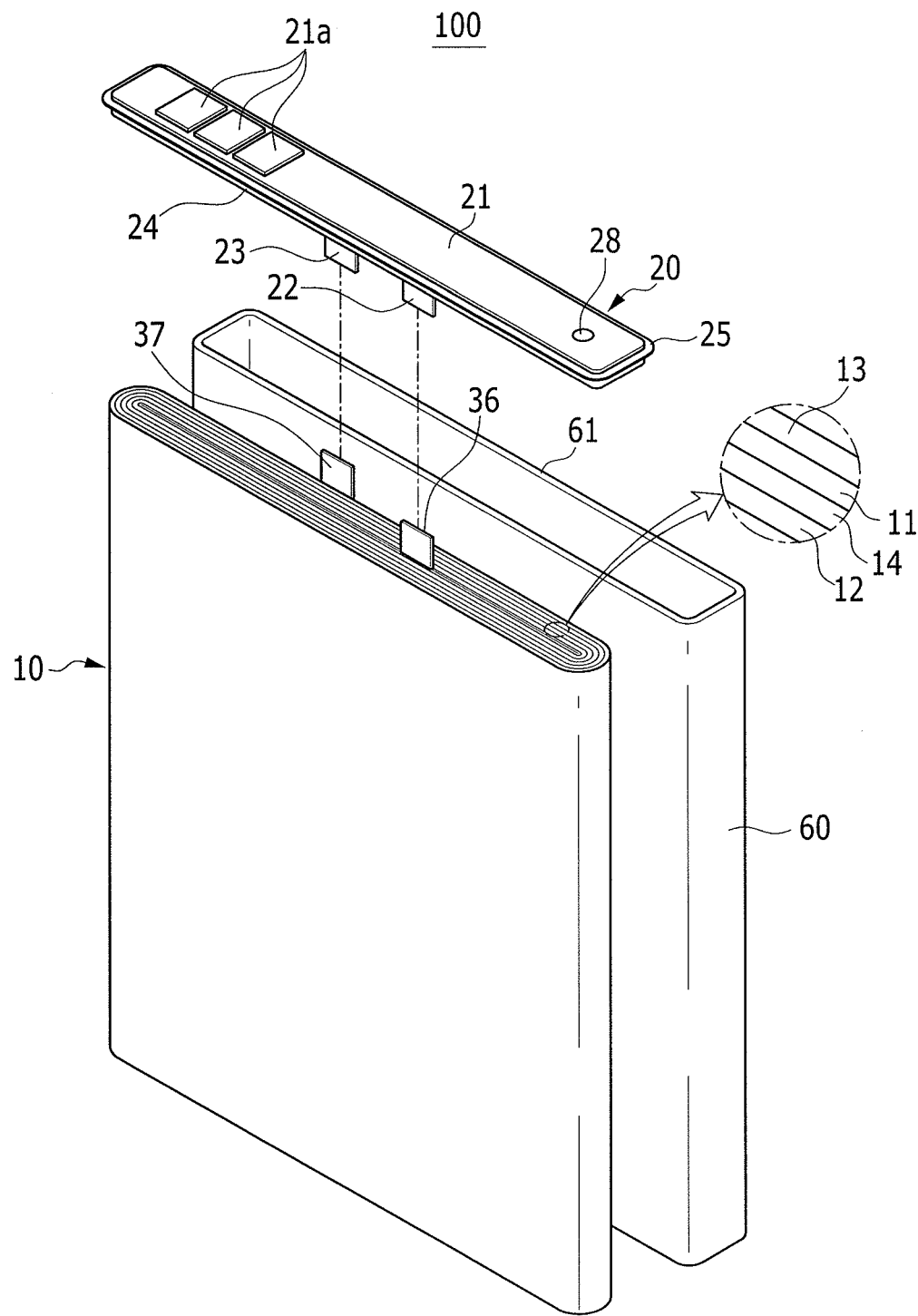
FIG. 1 is an exploded perspective view showing a rechargeable battery according to a first example embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art. In the drawing figures, dimensions may be exaggerated for clarity of illustration. Like reference numerals refer to like elements throughout.

FIG. 1 is an exploded perspective view showing a rechargeable battery according to a first example embodiment.

In the example embodiment shown in FIG. 1, the rechargeable battery 100 includes an electrode assembly 10, a cap assembly 20, and a case 60 bonded to the cap assembly 20. Herein, although a rectangular battery is described by way of an example, embodiments may be applied to various rechargeable batteries such as a pouch battery, a lithium polymer battery, and the like.

In the present example embodiment, the electrode assembly 10 includes a positive electrode 11, a negative electrode 12, and a separator 13, 14 disposed therebetween. The electrode assembly may include the positive electrode 11, the negative electrode 12, and the separator 13 and 14 disposed in a stack as a repeating arrangement of electrode/separator/electrode, e.g., using a plurality of positive electrode members, a plurality of negative electrode members, and a plurality of separator members, using a jelly roll, etc.

In the present example embodiment, the positive electrode 11 is formed to have a stripe shape and includes a positive electrode coated region in which a positive electrode active material layer is formed and a positive electrode uncoated region in which the active material is not coated. The positive electrode uncoated region is positioned at one side end of the positive electrode in a length direction.

The negative electrode 12 is formed to have a stripe shape and includes a negative electrode coated region in which a negative electrode active material layer is formed and a negative electrode uncoated region in which the active material is not coated. The negative electrode uncoated region is positioned at one side end of the negative electrode in a length direction. The positive electrode 11 and the negative electrode 12 have the separator 13, 14, which is an insulator, interposed therebetween. The positive electrode 11 and the negative electrode 12 may be spiral-wound together with the separator 13, 14 to have a jelly roll form.

In the present example embodiment, a positive electrode tab 36 is fixedly installed in the positive electrode 11 and a negative electrode tab 37 is fixedly installed in the negative electrode 12. The positive electrode tab 36 and the negative electrode tab 37 are disposed in parallel with a winding axis X1, and are installed to be protruded to a cross-sectional part of the electrode assembly 10 of which layers are exposed.

According to the present example embodiment, a cap assembly 20 includes a circuit board 21, a first lead tab 22, and a second lead tab 23. The cap assembly 20 is coupled with an opening 61 of the case 60 and is connected with the electrode assembly 10 to control an operation the electrode assembly 10.

The first lead tab 22 is made of an electrically conductive material such as nickel and is electrically connected to the circuit board 21. The first lead tab 22 serves to electrically connect the circuit board 21 to the electrode assembly 10 and is installed to the central portion of a first surface in the circuit board 21. The first lead tab 22 is connected with the positive electrode tab 36 of the electrode assembly 10 by welding.

The second lead tab 23 is positioned at the one side end of the circuit board 21 in a length direction and serves to electrically connect the circuit board 21 to the electrode assembly 10. The second lead tab 23 is made of an electrically conductive material such as nickel and is connected with the negative electrode tab 37 by the welding.

The circuit board 21, which is a printed circuit board on which a wiring pattern is printed, is formed to have a rectangular thin flat shape that is lengthily expended in one direction. A protective circuit device is mounted in the circuit board 21. The protective circuit device is formed of a device such as control IC, a charging and discharging switch, and the like. The circuit board 21 is provided with a molding part 24 enclosing the protective circuit device on a lower portion thereof.

The circuit board 21 is provided with an outer terminal 21a installed therein to be electrically connected to a charger or an external load. The circuit board 21 is provided with an electrolyte injection opening for injecting the electrolyte solution, and the electrolyte injection opening is provided with a sealing closure 28 sealing the electrolyte injection opening.

The cap assembly 20 is provided with a bonding part 25 extended in a circumference direction of the circuit board 21 at the edge thereof. The circuit board 21 is formed to have a rectangular flat shape, and the bonding part 25 is protruded to the outside in the side end of the circuit board 21 to have an approximately rectangular ring shape. The bonding part 25 is bonded to the opening 61 formed in the case 60 by a method such as welding and the like to seal the case 60.

Figure 2:
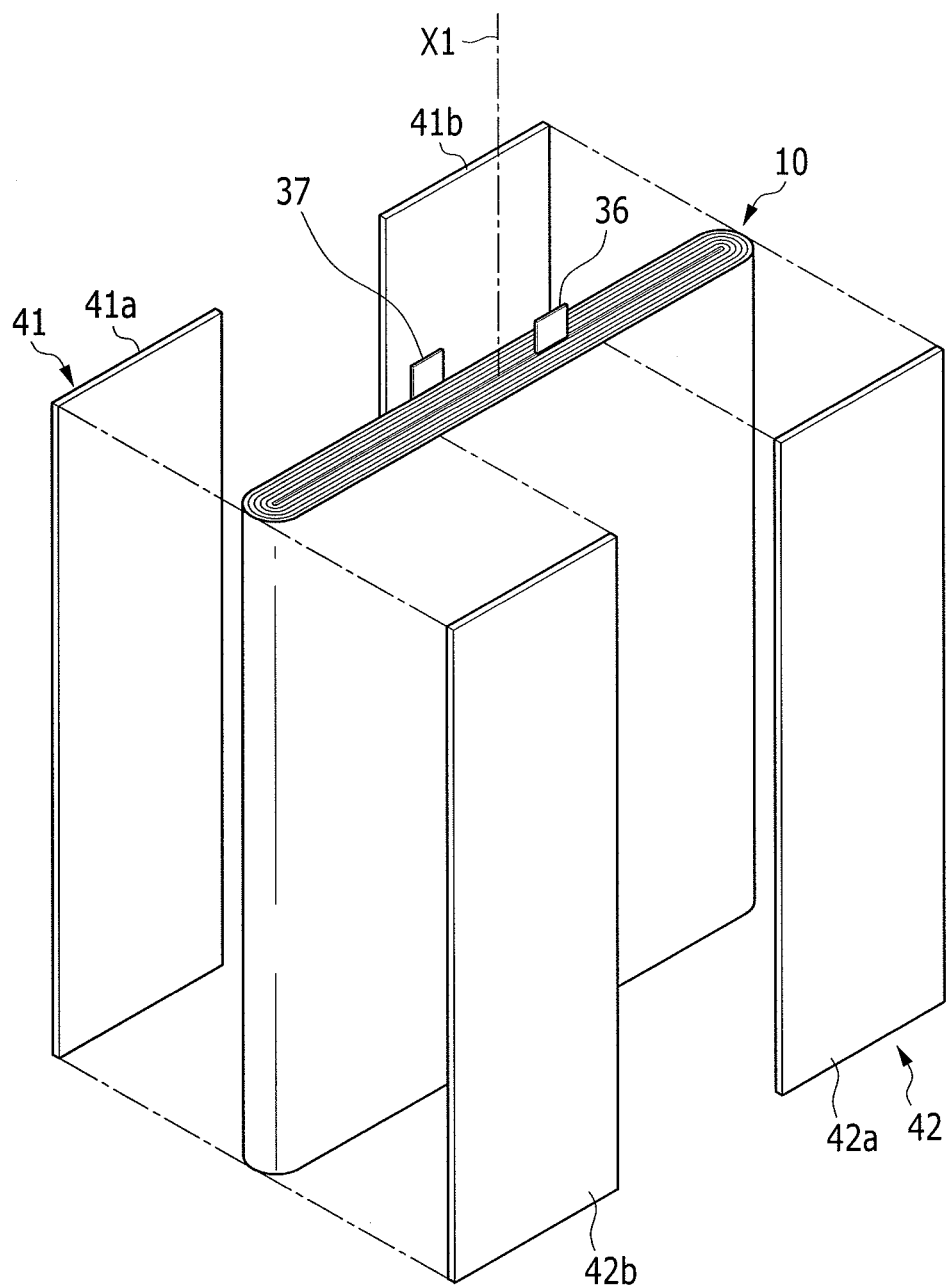
FIG. 2 is a perspective view showing a process of thermo-compressing an electrode assembly according to the first example embodiment.
Figure 3:
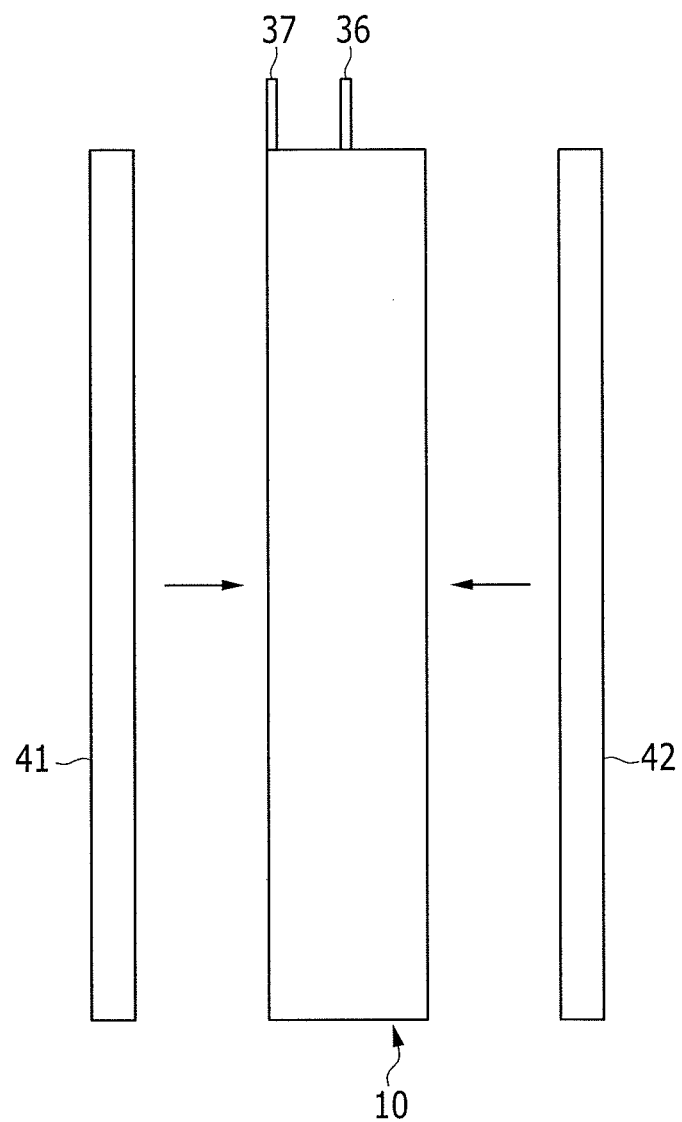
FIG. 3 is a side view showing a process of thermo-compressing an electrode assembly according to the first example embodiment.

FIG. 2 is a perspective view showing a process of thermo-compressing an electrode assembly according to the first example embodiment and FIG. 3 is a side view showing a process of thermo-compressing an electrode assembly according to the first example embodiment.

In the example embodiment shown in FIGS. 2 and 3, the electrode assembly 10 is spiral-wound and then is thermo-compressed by a first pressing plate 41 and a second pressing plate 42. The first pressing plate 41 and the second pressing plate 42 are heated in advance and compress the electrode assembly 10, such that the positive electrode 11 and the negative electrode 12 are closely adhered to the separators 13 and 14.

According to the present example embodiment, the first pressing plate 41 includes a first board 41a and a second board 41b spaced from the first board 41a. The first board 41a is spaced apart from the second board 41b by a predetermined interval. The first board 41a and the second board 41b are disposed to the outside of the positive electrode tab 36 and the negative electrode tab 37, respectively. Thus, the first board 41a is disposed laterally more to the outside than the negative electrode tab 37 in a width direction of the electrode assembly 10, and the second board 41b is disposed laterally more to the outside than the positive electrode tab 36 in the width direction of the electrode assembly 10.

The second pressing plate 42 has a same shape as the first pressing plate 41 and includes a first board 42a and a second board 42b spaced from the first board 42a. The first board 42a is spaced apart from the second board 42b by a predetermined interval. The first board 42a and the second board 42b are disposed more to the outside than the positive electrode tab 36 and the negative electrode tab 37, respectively. Thus, the first board 42a is disposed laterally more to the outside than the negative electrode tab 37 in a width direction of the electrode assembly 10, and the second board 42b is disposed laterally more to the outside than the positive electrode tab 36 in the width direction of the electrode assembly 10. The first pressing plate 41 and the second pressing plate 42 press flat front and rear surfaces in the electrode assembly 10, respectively.

Figure 4:
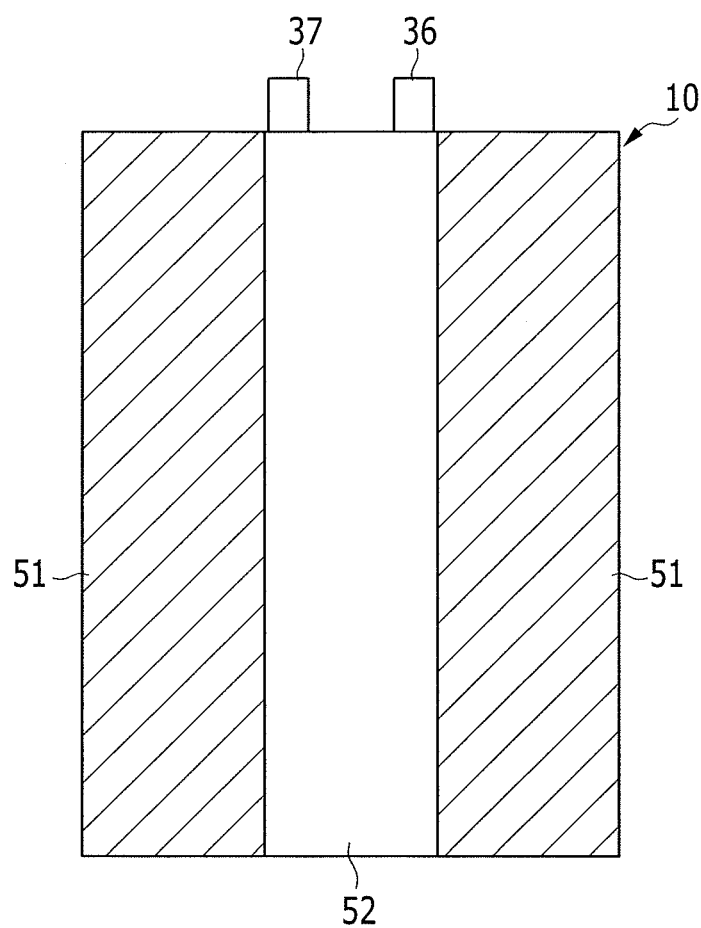
FIG. 4 is a top plan view showing a thermo-compressed electrode assembly according to the first example embodiment.
Figure 5:
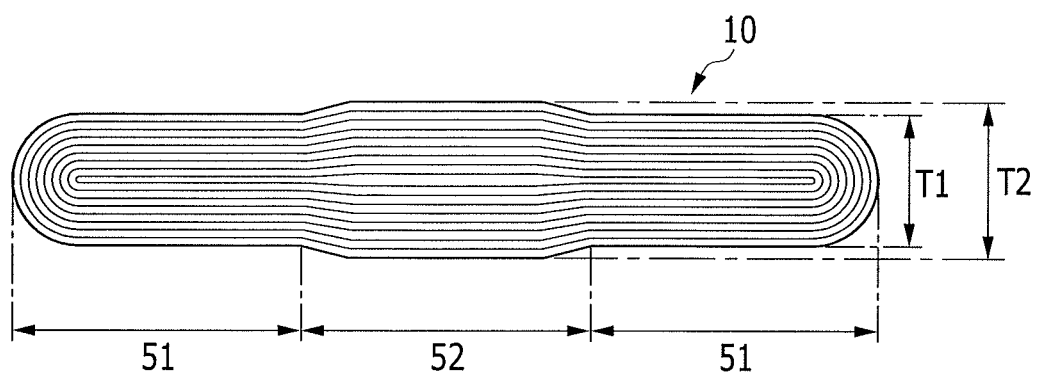
FIG. 5 is a cross-sectional view showing an electrode assembly according to the first example embodiment.

FIG. 4 is a top plan view showing a thermo-compressed electrode assembly according to the first example embodiment and FIG. 5 is a cross-sectional view showing an electrode assembly according to the first example embodiment.

Referring to FIGS. 4 and 5, the electrode assembly 10 has pressing regions 51 that are compressed by the pressing plates 41 and 42 and a non-pressing region 52 that is not compressed by the pressing plates 41 and 42. Pressing the electrode assembly 10 may include applying pressure to the electrode assembly 10 using a pressing plate with an opening or slit being aligned with one or more of the positive and negative electrode tabs 36, 37.

According to the present example embodiment, the two pressing regions 51 are formed at the outside based on the width direction of the electrode assembly 10 and the non-pressing region 52 is formed between the pressing regions 51. The non-pressing region 52 is disposed at the central portion of the electrode assembly 10 in the width direction and is laterally enclosed by the pressing region 51. The non-pressing region 52 is extended in the length direction of the winding axis X1 around which the electrode assembly 10 is spiral-wound and is extended from the one side end of the electrode assembly 10 to the other side end thereof.

According to the present example embodiment, the electrode assembly 10 may have a greater thickness in a region overlying the electrode tabs 36, 37 than in a region peripheral to the electrode tabs 36, 37. Referring to FIG. 5, the positive electrode 11 and the negative electrode 12 in the pressing region 51 are closely adhered to the separators 13 and 14, such that thickness T1 in the thickness direction of the pressing region 51 is smaller than a thickness T2 in the thickness direction of the non-pressing region 52 corresponding to at least one of the electrode tabs. The electrode assembly 10 may have the second thickness T2 at a position midway between a lateral or side edge and the non-pressing region 52. According to the present example embodiment, the non-pressing region 52 having the thickness T2 may extend from edge to edge in the height direction in the non-pressing region 52. An interval between the positive electrode 11 and the separators 13 and 14 in the pressing region 51 is smaller than that of between the positive electrode 11 and the separators 13 and 14 in the non-pressing region 52. In addition, an interval between the negative electrode 12 and the separators 13 and 14 in the pressing region 51 is smaller than that between the negative electrode 12 and the separators 13 and 14 in the non-pressing region 52. Therefore, the non-pressing region 52 may absorb a larger amount of electrolyte solution than the pressing region 51.

Figure 6:
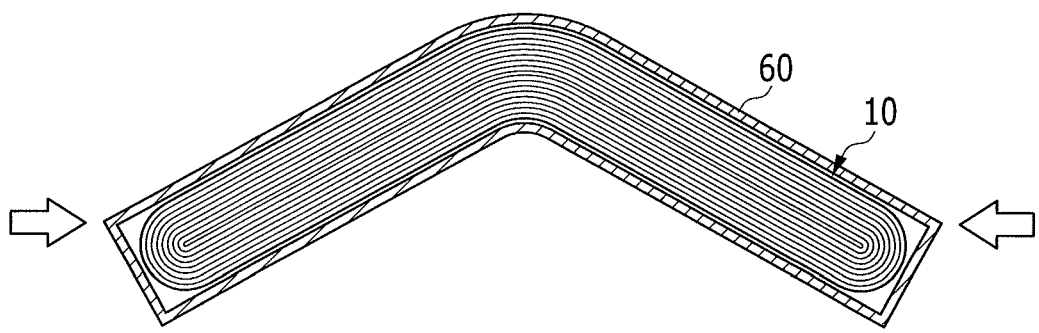
FIG. 6 is a cross-sectional view showing a state in which a rechargeable battery is bent due to longitudinal compressive force acted on the rechargeable battery according to the first example embodiment.

The non-pressing region 52, which is not thermo-compressed, may have greater flexibility compared to the pressing region 51, such that the non-pressing region 52 is less easily broken and may be easily bent. For example, as shown in FIG. 6, when the compressive force acts on the rechargeable battery 100 in a longitudinal direction, the non-pressing region 52 may bend, which may help reduce or prevent the electrode assembly 10 from being damaged.

FIG. 7A is an image showing a surface of the electrode assembly thermo-compressed in a scheme according to a comparative example, and FIG. 7B is an image showing a surface of an electrode assembly according to the first example embodiment.

Referring to FIGS. 7A and 7B, the electrode assembly according to the comparative example shows indications that lithium is extracted on the surface of the negative electrode at a portion at which the positive electrode tab and the negative electrode tab are disposed (see arrows). In the comparative example, the portion at which the positive electrode tab and the negative electrode tab are positioned has a relatively thick thickness as compared with the other portion, the lithium is extracted due to the pressure by the pressing plates on the portion.

Referring to FIG. 7B, a portion at which the positive electrode tab and the negative electrode tab are positioned is not pressed by the pressing plates, i.e., is the non-pressing region, and lithium is not extracted in the surface of the negative electrode.

Figure 8A:
FIG. 8A is an image showing a state in which a rechargeable battery according to a comparative example is deformed by longitudinal compressive force.
Figure 8B:
FIG. 8B is an image showing a state in which a rechargeable battery according to the first example embodiment is deformed by longitudinal compressive force.

FIG. 8A is an image showing a state in which a rechargeable battery according to a comparative example is deformed by longitudinal compressive force, and FIG. 8B is an image showing a state in which a rechargeable battery according to the first example embodiment is deformed by longitudinal compressive force.

Referring to FIGS. 8A and 8B, after charging rectangular rechargeable batteries having a metal case and a capacity of 2800 mA, a voltage of 3.8 V, thickness of 5 mm, width of 57 mm, and a height of 61 mm, a longitudinal compressive force was used to test for safety.

As shown in FIG. 8A, in the case in which the front surface of the electrode assembly according to a comparative example is pressed, it can be seen that the four rechargeable batteries among the ten rechargeable batteries were ignited and blackened when the longitudinal compressive force acted on the rechargeable battery. However, as shown in FIG. 8B, the rechargeable battery according to the first example embodiment, it can be seen that a fire did not break out even though the rechargeable batteries were deformed.

Figure 9:
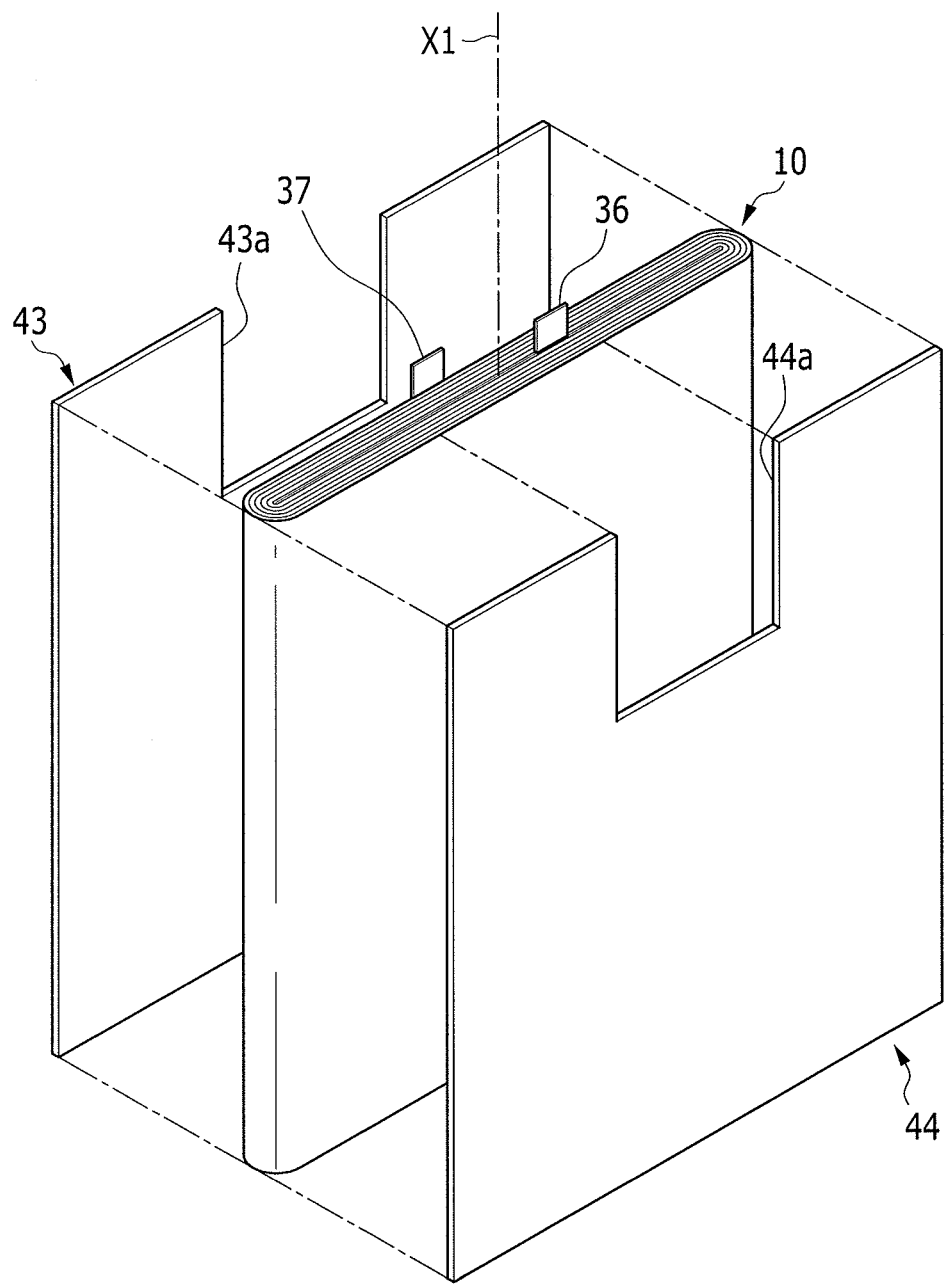
FIG. 9 is a perspective view showing a process of thermo-compressing an electrode assembly according to a second example embodiment.
Figure 10:
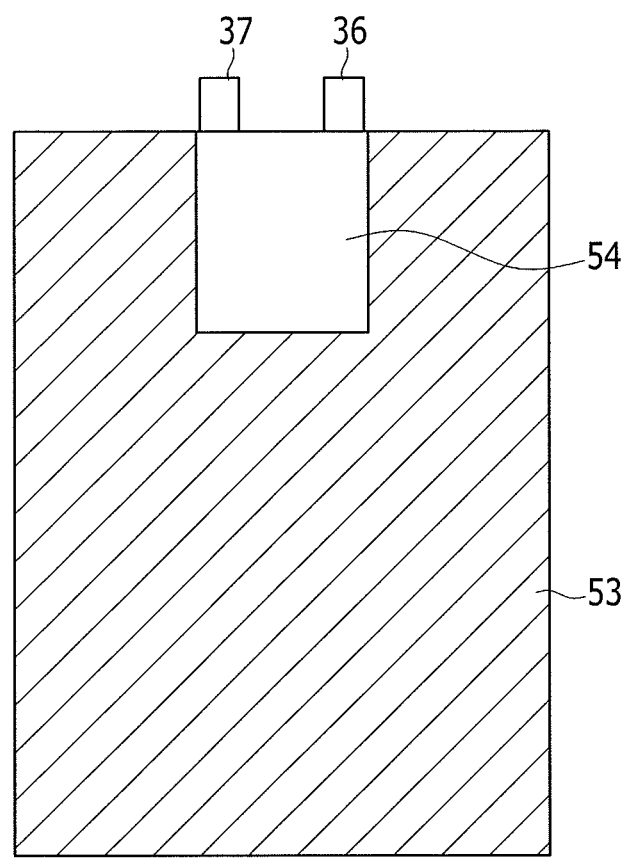
FIG. 10 is a side view showing a thermo-compressed electrode assembly according to the second example embodiment.

FIG. 9 is a perspective view showing a process of thermo-compressing an electrode assembly according to a second example embodiment and FIG. 10 is a side view showing a thermo-compressed electrode assembly according to the second example embodiment.

Referring to FIGS. 9 and 10, the electrode assembly according to the present example embodiment has a similar structure as the rechargeable battery according to the first example embodiment, other than the thermo-compressed structure, and therefore the description of same structures will not be repeated.

Referring to FIG. 9, the electrode assembly 10 is spiral-wound and then is thermo-compressed by a first pressing plate 43 and a second pressing plate 44. The first pressing plate 43 and the second pressing plate 44 are heated in advance and compress the electrode assembly 10, such that the positive electrode 11 and the negative electrode 12 are closely adhered to the separators 13 and 14.

In the present example embodiment, the first pressing plate 43 is formed of a quadrangular flat shape, and is provided with a cut or slit part 43a. The slit part 43a is formed at a position corresponding to an upper end portion at which the positive electrode tab 36 and the negative electrode tab 37 are positioned in the electrode assembly 10.

In addition, the second pressing plate 42 has a same shape as the first pressing plate 41, and the second pressing plate 44 is provided with a cut or slit part 44a. The slit part 43a is formed at the upper end of the second pressing plate 44.

When the electrode assembly 10 is thermo-compressed by using the pressing plates 43 and 44, the electrode assembly 10 is formed with the pressing region 53 and the non-pressing region 54 as shown in FIG. 10. According to the present example embodiment, the non-pressing region 54, which may have the thickness T2, may extend from the edge at which the electrode tabs 36, 37 protrude to a position spaced apart from the opposite edge in the height direction, and the pressing region 53 surrounding the non-pressing region 54 may have the thickness T1. Edges other than the edge at which the electrode tabs 36, 37 protrude may have the thickness T1, and lateral portions of the edge at which the electrode tabs 36, 37 protrude may also have the thickness T1. The non-pressing region 54 is formed at the end portion in which the lead tabs 36 and 37 are protruded at the center of the electrode assembly 10 in the width direction. The non-pressing region 54 is extended in the length direction of the winding axis X1 from the end portion in which the lead tabs 36 and 37 are protruded, and the non-pressing region 54 is enclosed by the pressing region 53.

Figure 11:
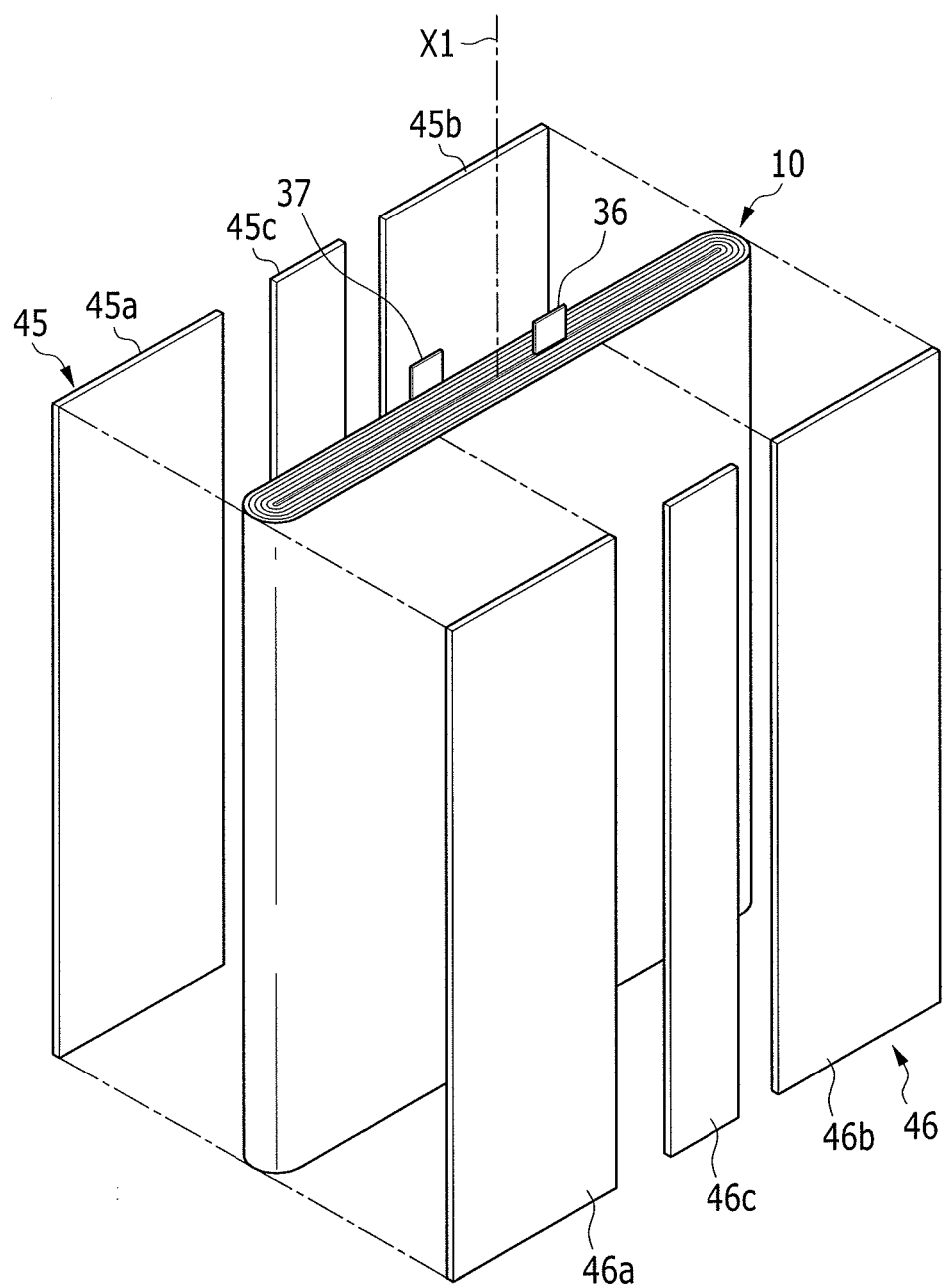
FIG. 11 is a perspective view showing a process of thermo-compressing an electrode assembly according to a third example embodiment.
Figure 12:
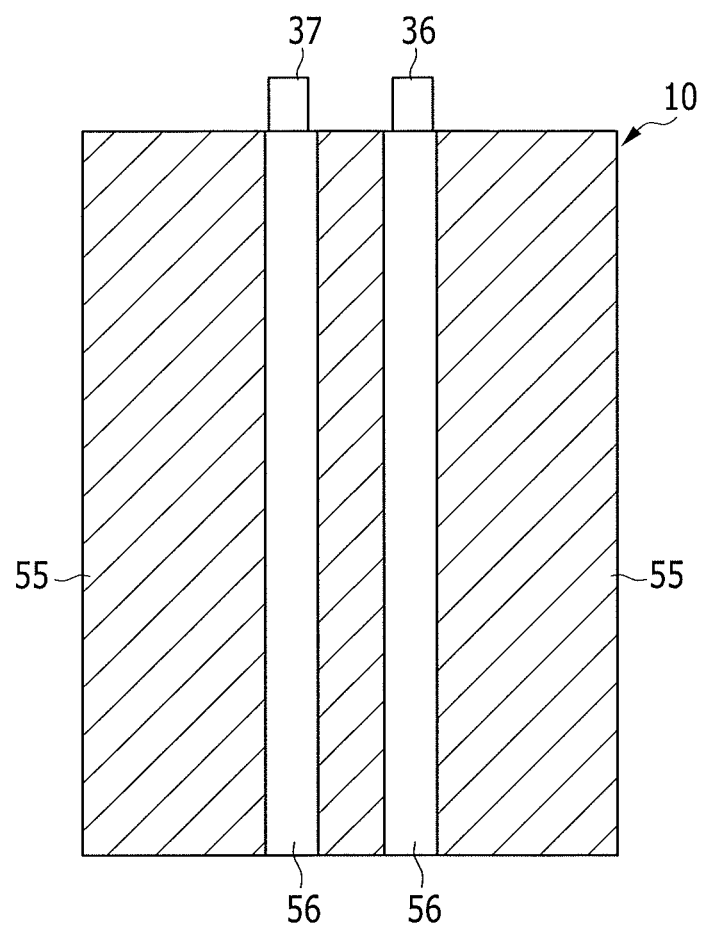
FIG. 12 is a side view showing a thermo-compressed electrode assembly according to the third example embodiment.

FIG. 11 is a perspective view showing a process of thermo-compressing an electrode assembly according to a third example embodiment and FIG. 12 is a side view showing a thermo-compressed electrode assembly according to the third example embodiment.

Referring to FIGS. 11 and 12, the electrode assembly according to the present example embodiment has a similar structure as the rechargeable battery according to the first example embodiment, other than the thermo-compressed structure, and therefore the description of same structures will not be repeated.

The electrode assembly 10 is spiral-wound and then is thermo-compressed by a first pressing plate 45 and a second pressing plate 46. The first pressing plate 45 and the second pressing plate 46 are heated in advance and compress the electrode assembly 10, such that the positive electrode 11 and the negative electrode 12 are closely adhered to the separators 13 and 14.

According to the present example embodiment, the first pressing plate 45 includes a first board 45a, a second board 45b spaced from the first board 45a, and a third board 45c disposed between the first board 45a and the second board 45b. The third board 45c may be spaced apart from each of the first board 45a and the second board 45b.

Referring to FIG. 12, the first board 45a and the second board 45b are disposed to the outside of the positive electrode tab 36 and the negative electrode tab 37, respectively. The negative electrode tab 37 is disposed between the first board 45a and the third board 45c and the positive electrode tab 36 is disposed between the second board 45b and the third board 45c.

The second pressing plate 46 has a same shape as the first pressing plate 45 and includes a first board 46a, a second board 46b spaced from the first board 46a, and a third board 46c disposed between the first board 46a and the second board 46b. The first board 46a is spaced apart from the second board 46b by a predetermined interval. The first board 46a and the second board 46b are disposed to the outside of the positive electrode tab 36 and the negative electrode tab 37, respectively. In addition, the negative electrode tab 37 is disposed between the first board 46a and the third board 46c and the positive electrode tab 36 is disposed between the second board 46b and the third board 46c.

The electrode assembly 10 is formed with pressing regions 55 which is compressed by the pressing plates 45 and 46 and a non-pressing region 56 which is not pressed by a plate. The three pressing regions 55 are formed at the two outsides and at the center based on the width direction of the electrode assembly 10 and the two non-pressing regions 56 are formed between the pressing regions 55. The non-pressing regions 56 are enclosed by the pressing regions 55.

The non-pressing region 56 is extended in the length direction of the winding axis X1 around which the electrode assembly 10 is spiral-wound and may be extended from the one end of the electrode assembly 10 to the other end thereof, e.g., from the top to the bottom thereof in FIG. 12.

Figure 13:
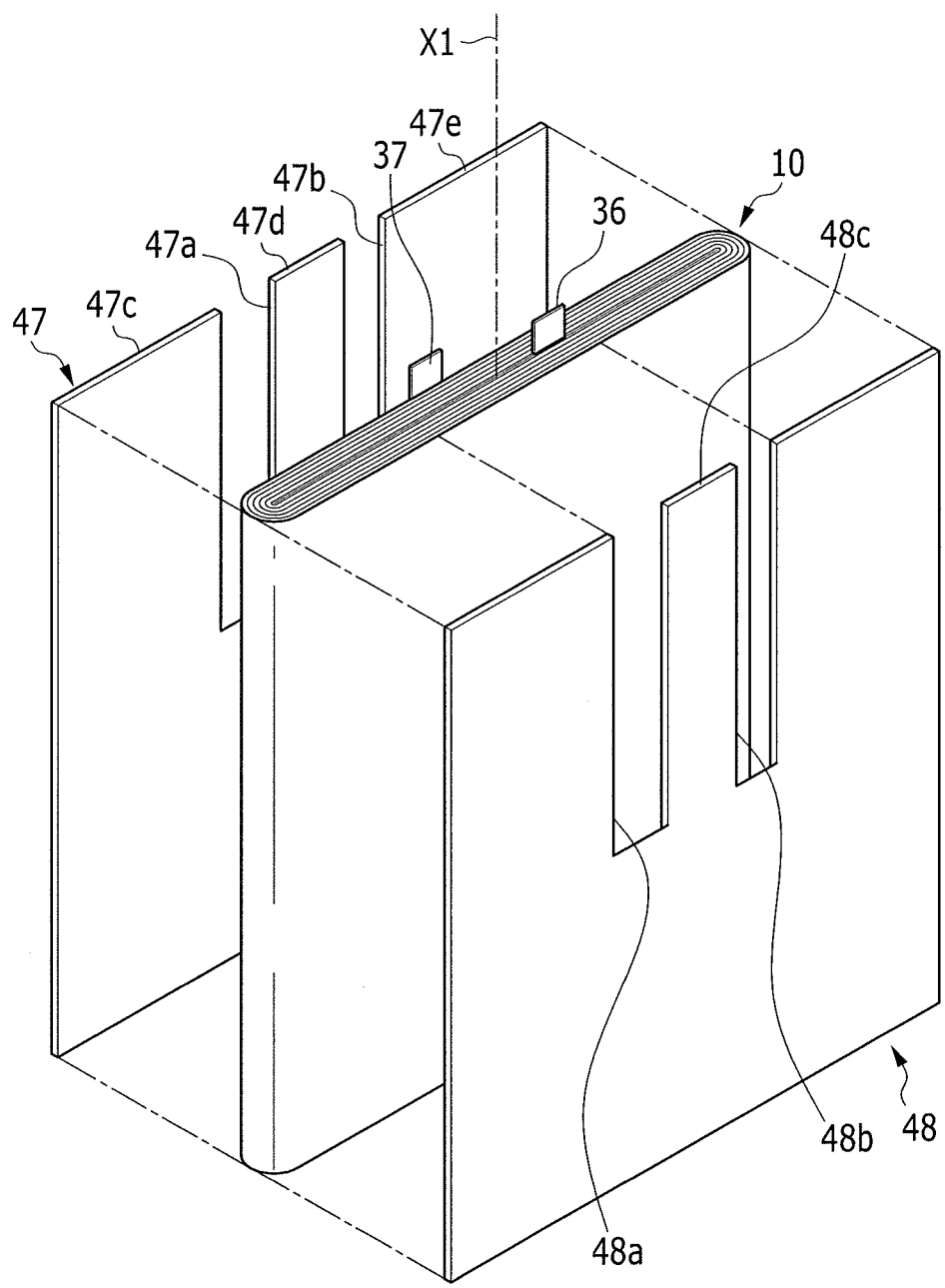
FIG. 13 is a perspective view showing a process of thermo-compressing an electrode assembly according to a fourth example embodiment.
Figure 14:
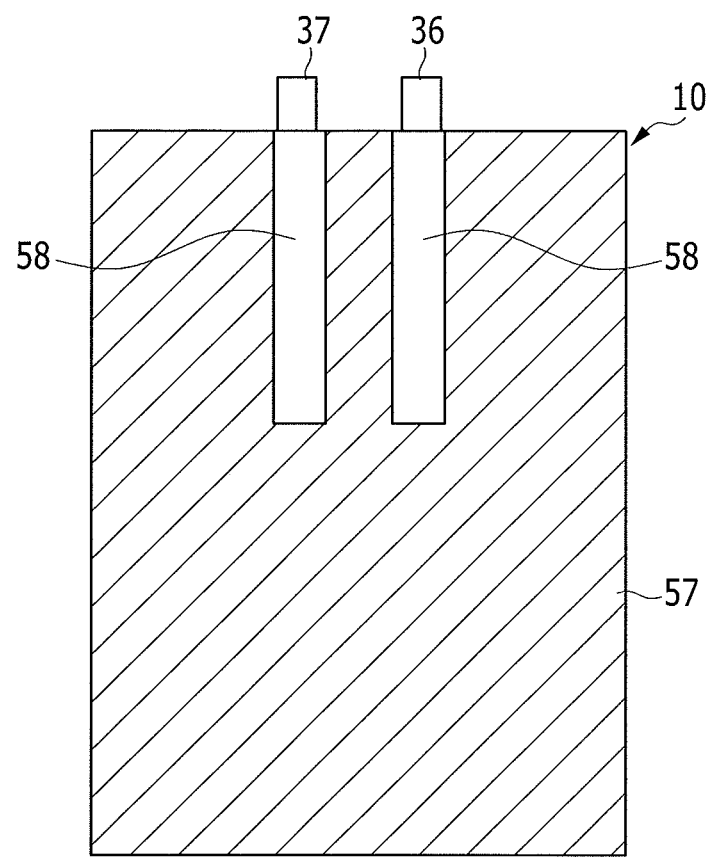
FIG. 14 is a side view showing a thermo-compressed electrode assembly according to the fourth example embodiment.

FIG. 13 is a perspective view showing a process of thermo-compressing an electrode assembly according to a fourth example embodiment and FIG. 14 is a side view showing a thermo-compressed electrode assembly according to the fourth example embodiment.

Referring to FIGS. 13 and 14, the electrode assembly according to the present example embodiment has a similar structure as the rechargeable battery according to the first example embodiment, other than the thermo-compressed structure, and therefore the description of same structures will not be repeated.

The electrode assembly 10 is spiral-wound and then is thermo-compressed by a first pressing plate 47 and a second pressing plate 48. The first pressing plate 47 and the second pressing plate 48 are heated in advance and compress the electrode assembly 10, such that the positive electrode 11 and the negative electrode 12 are closely adhered to the separators 13 and 14.

According to the present example embodiment, the first pressing plate 47 is formed of a quadrangular flat shape, and is provided with a first slit part 47a and a second slit part 47b. The first slit part 47a is disposed to be spaced apart from the second slit part 47b in the width direction of the electrode assembly, the first slit part 47a and the second slit part 47b have a protrusion 47d formed therebetween, and plate parts 47c and 47 are to the outside of the slit parts 47a and 47b, respectively.

The first slit part 47a is formed at a position corresponding to the negative electrode tab 37 in the electrode assembly 10 and the second slit part 47b is formed at a position corresponding to the positive electrode tab 36 in the electrode assembly 10.

The second pressing plate 48 has a same shape as the first pressing plate 47, and the second pressing plate 48 is provided with a first slit part 48a and a second slit part 48b. The first slit part 48a is disposed to be spaced apart from the second slit part 48b in the width direction of the electrode assembly, and the first slit part 48a and the second slit part 48b have a protrusion 48c formed therebetween.

The first slit part 48a is formed at a position corresponding to the negative electrode tab 37 in the electrode assembly 10 and the second slit part 48b is formed at a position corresponding to the positive electrode tab 36 in the electrode assembly 10.

When the electrode assembly 10 is thermo-compressed by using the pressing plates 47 and 48, the electrode assembly 10 is formed with the pressing region 57 and the non-pressing regions 58 as shown in FIG. 14. The two non-pressing regions 58 disposed to be spaced from each other are formed to overlap the end portions in which the lead tabs 36 and 37 are protruded in the electrode assembly 10. The non-pressing regions 58 are extended in the length direction of the winding axis X1 from the end from which the lead tabs 36 and 37 protrude, and the non-pressing regions 58 are enclosed by the pressing region 57.

Figure 15:
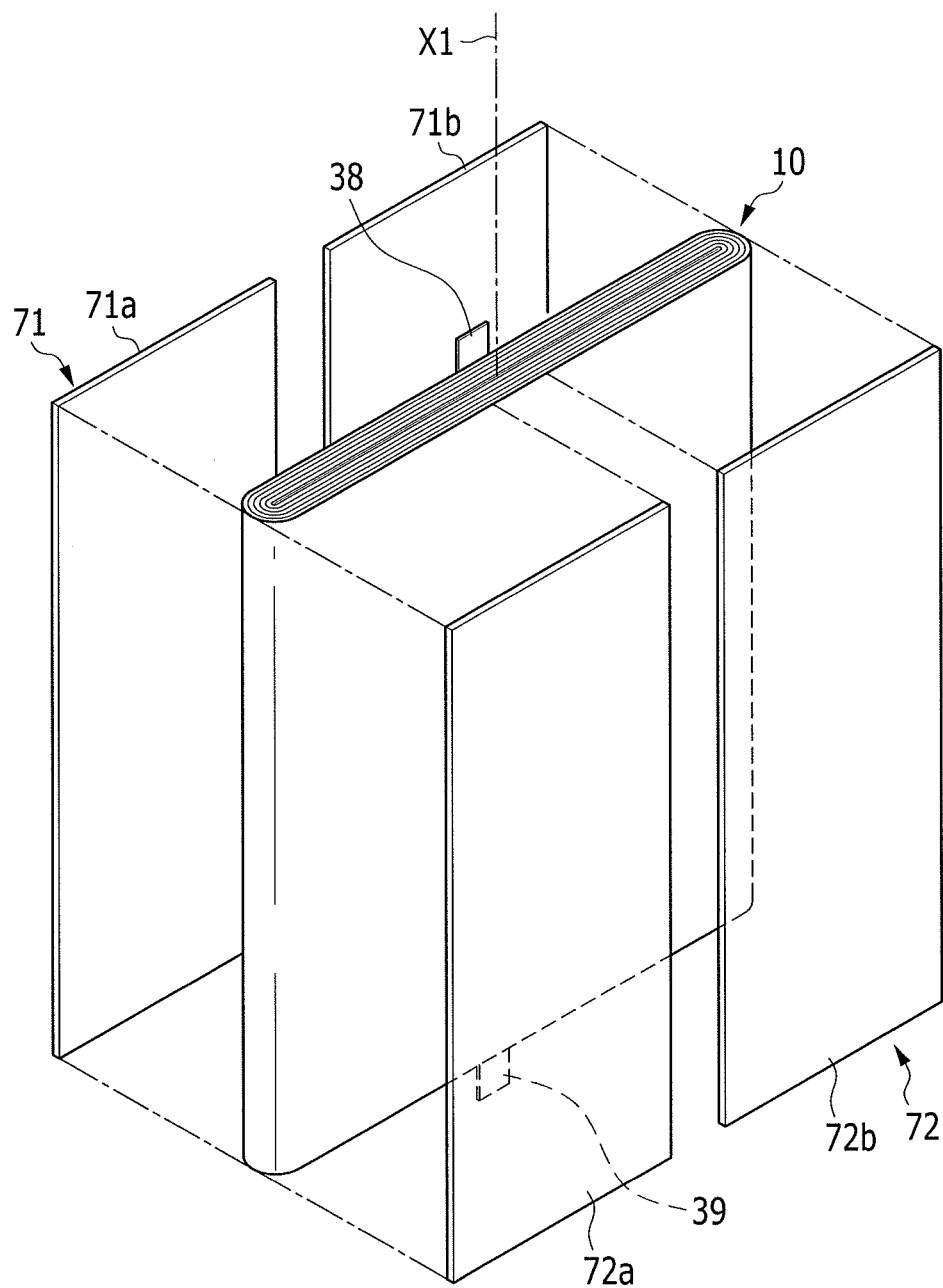
FIG. 15 is a perspective view showing a process of thermo-compressing an electrode assembly according to a fifth example embodiment.
Figure 16:
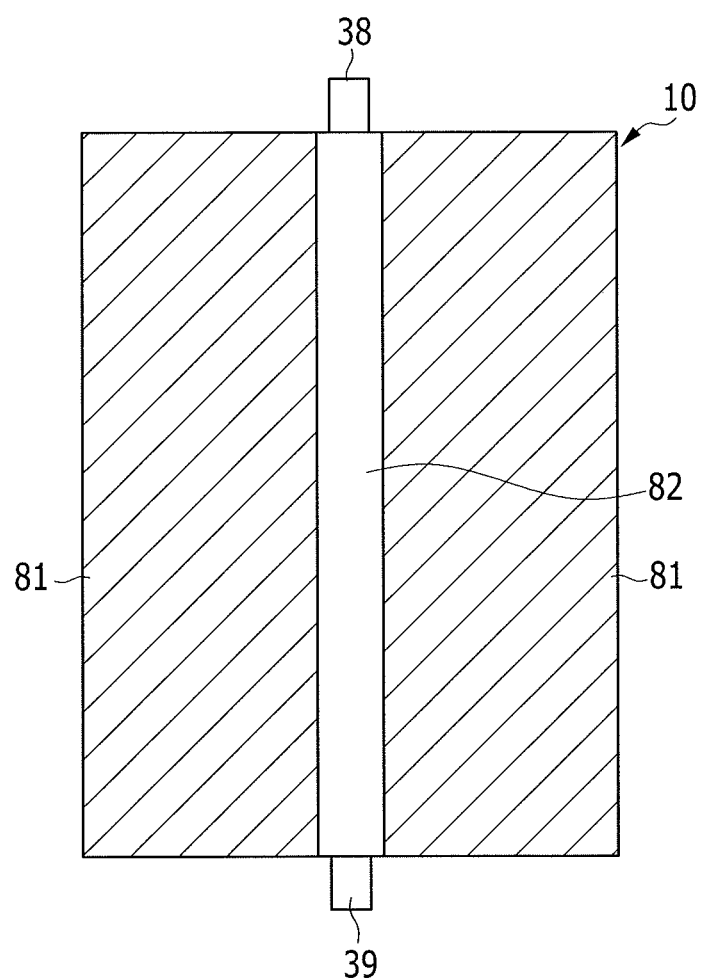
FIG. 16 is a side view showing a thermo-compressed electrode assembly according to the fifth example embodiment.

FIG. 15 is a perspective view showing a process of thermo-compressing an electrode assembly according to a fifth example embodiment and FIG. 16 is a side view showing a thermo-compressed electrode assembly according to the fifth example embodiment.

Referring to FIGS. 15 and 16, the electrode assembly according to the present example embodiment has a similar structure as the rechargeable battery according to the first example embodiment, other than the thermo-compressed structure and an installed structure of the lead tab, and therefore the description of same structures will not be repeated.

The electrode assembly 10 is formed to have a structure in which the positive electrode and the negative electrode are spiral-wound having the separator therebetween, and the electrode assembly 10 is provided with the positive electrode tab 38 and the negative electrode tab 39. The positive electrode tab 38 and the negative electrode tab 39 are disposed at the center of the electrode assembly 10 in the width direction. In the present example embodiment, the positive electrode tab 38 is protruded to one end of the electrode assembly 10 and the negative electrode tab 39 is protruded to an opposite end. Additionally, in the present example embodiment, the positive electrode tab 38 and the negative electrode tab 39 are disposed in a straight line.

The electrode assembly 10 is thermo-compressed by a first pressing plate 71 and a second pressing plate 72. The first pressing plate 71 and the second pressing plate 72 are heated in advance and compress the electrode assembly 10, such that the positive electrode 11 and the negative electrode 12 are closely adhered to the separators 13 and 14.

According to the present example embodiment, the first pressing plate 71 includes a first board 71a and a second board 71b spaced from the first board 71a. The first board 71a and the second board 71b are disposed laterally to the outside of the positive electrode tab 38 and the negative electrode tab 39, and the first board 71a and the second board 71b have the positive electrode tab 38 and the negative electrode tab 39 disposed therebetween.

The second pressing plate 72 has a same shape as the first pressing plate 71, and includes a first board 72a and a second board 72b spaced from the first board 72a. The first board 72a is spaced apart from the second board 72b by a predetermined interval. The first board 72a and the second board 72b have the positive electrode tab 38 and the negative electrode tab 39 disposed therebetween.

Referring to FIG. 16, the electrode assembly 10 is formed with pressing regions 81 which are compressed by the pressing plates 71 and 72 and a non-pressing region 82 which is not compressed. The pressing regions 81 are formed at outsides of the positive electrode tab 38 and the negative electrode tab 39, based on the width direction of the electrode assembly 10, and the non-pressing region 82 is formed between the pressing regions 81.

Figure 17:
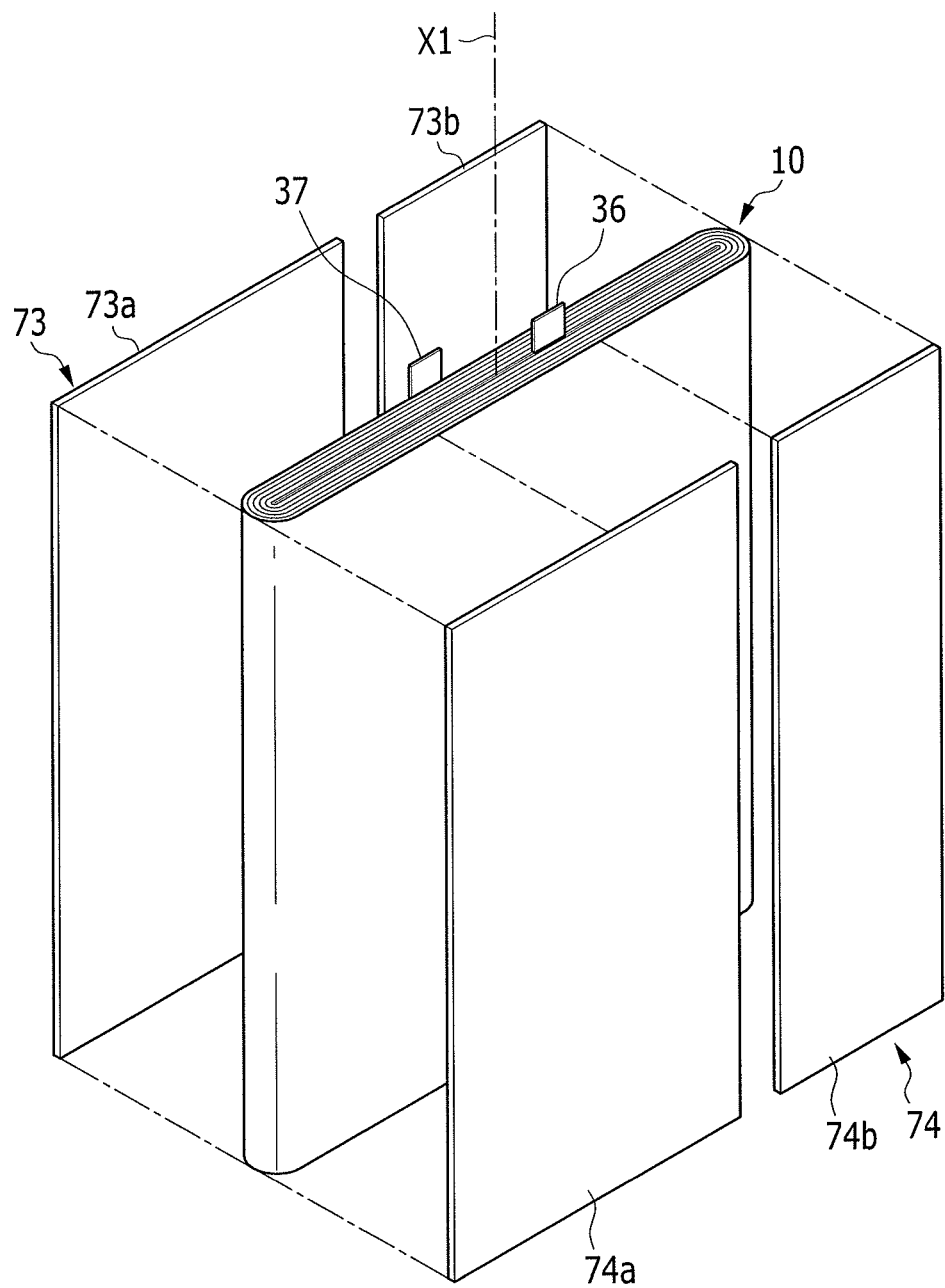
FIG. 17 is a perspective view showing a process of thermo-compressing an electrode assembly according to a sixth example embodiment.
Figure 18:
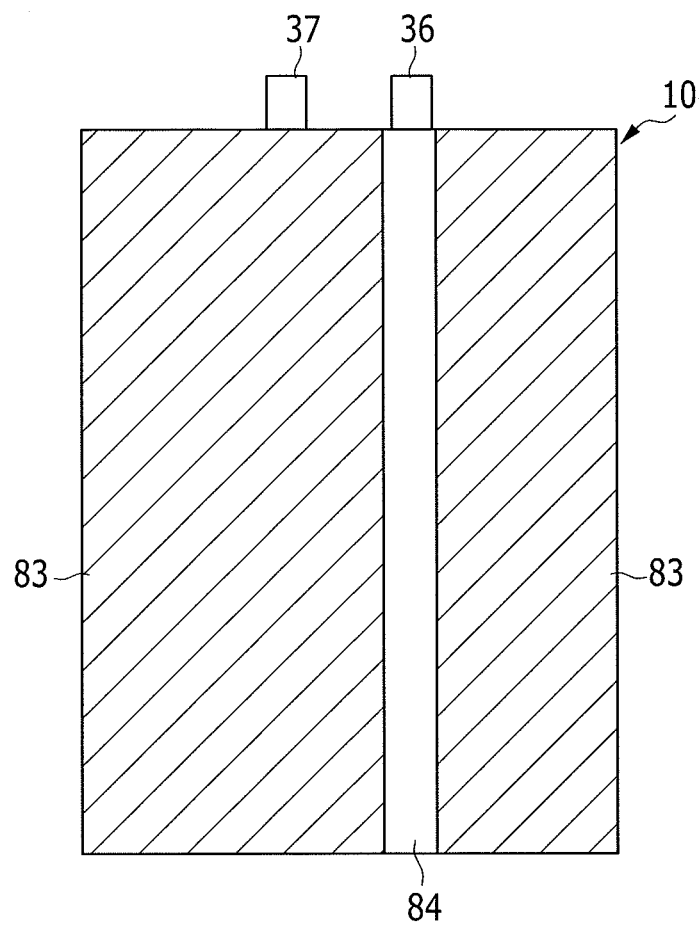
FIG. 18 is a side view showing a thermo-compressed electrode assembly according to the sixth example embodiment.

FIG. 17 is a perspective view showing a process of thermo-compressing an electrode assembly according to a sixth example embodiment and FIG. 18 is a side view showing a thermo-compressed electrode assembly according to the sixth example embodiment.

Referring to FIGS. 17 and 18, the electrode assembly according to the present example embodiment has a similar structure as the rechargeable battery according to the first example embodiment, other than the thermo-compressed structure, and therefore the description of same structures will not be repeated.

The electrode assembly 10 is formed to have a structure in which the positive electrode and the negative electrode are spiral-wound having the separator therebetween, and the electrode assembly 10 is provided with the positive electrode tab 36 and the negative electrode tab 37. In the present example embodiment, the positive electrode tab 36 and the negative electrode tab 37 are disposed to be spaced apart in the width direction of the electrode assembly 10.

The electrode assembly 10 is thermo-compressed by a first pressing plate 73 and a second pressing plate 74. The first pressing plate 73 and the second pressing plate 74 are heated in advance and compress the electrode assembly 10, such that the positive electrode 11 and the negative electrode 12 are closely adhered to the separators 13 and 14.

The first pressing plate 73 includes a first board 73a and a second board 73b spaced from the first board 73a. The first board 73a and the second board 73b are disposed to the outside of the positive electrode tab 36, and the positive electrode tab 38 is disposed between the first board 71a and the second board 71b. In the present example embodiment, the negative electrode tab 37 is disposed to overlap with the first board 73a and is compressed by the first board 73a.

In addition, the second pressing plate 74 has a same shape as the first pressing plate 73, and includes a first board 74a and a second board 74b spaced from the first board 74a. The first board 74a is spaced apart from the second board 72b by a predetermined interval. The first board 74a and the second board 72b have the positive electrode tab 36 disposed therebetween. In the present example embodiment, the negative electrode tab 37 is disposed to overlap with the first board 74a and is compressed by the first board 74a.

Referring to FIG. 18, the electrode assembly 10 is formed with pressing regions 83 which are compressed by the pressing plates 73 and 74 and a non-pressing region 84 which is not compressed. The pressing regions 83 are formed at lateral sides based on the width direction of the electrode assembly 10 and the non-pressing region 84 is formed between the pressing regions 83. The non-pressing region 84 is disposed eccentric or offset to one lateral side from the center of the electrode assembly 10 in the width direction.

Figure 19:
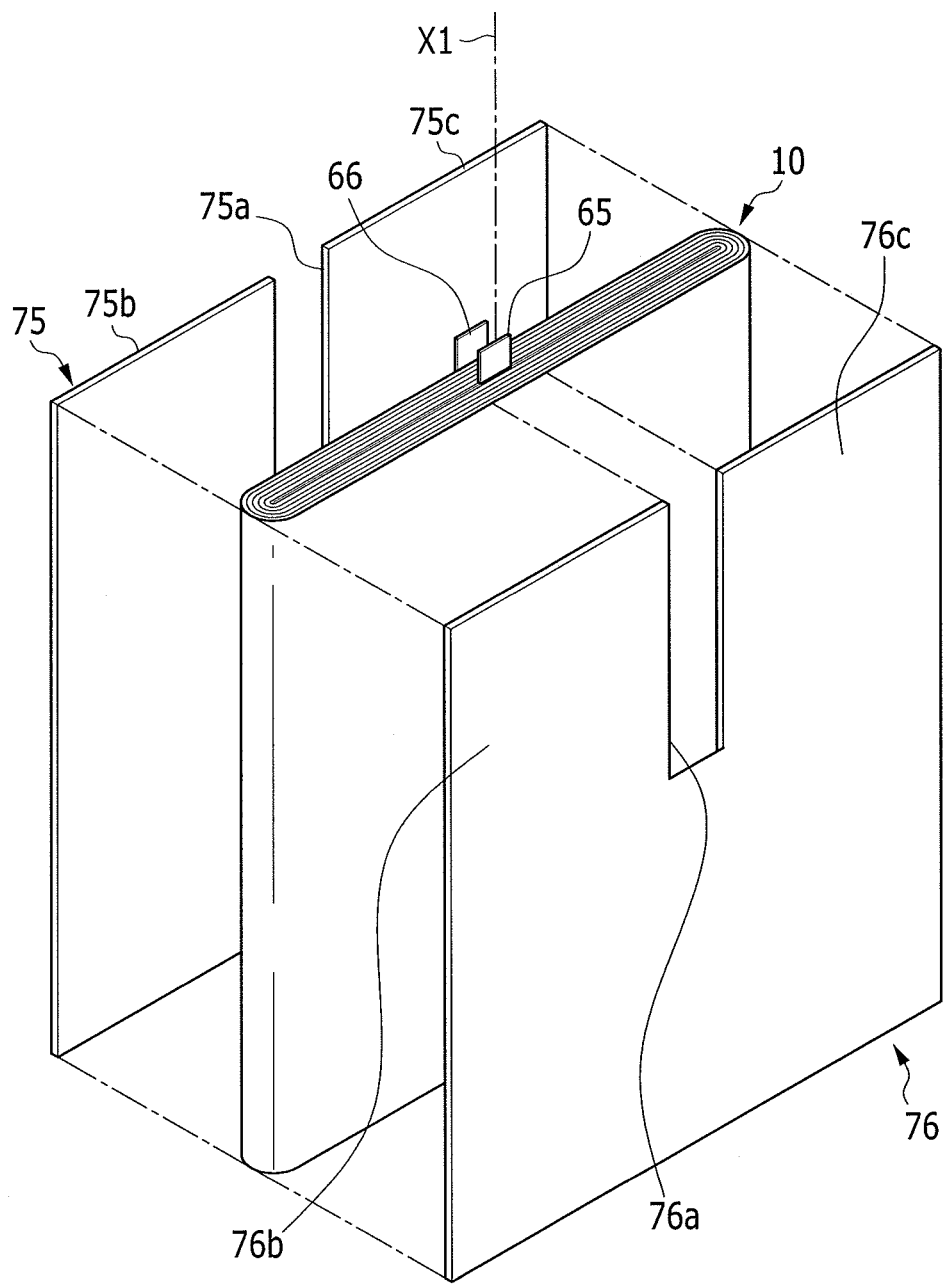
FIG. 19 is a perspective view showing a process of thermo-compressing an electrode assembly according to a seventh example embodiment.
Figure 20:
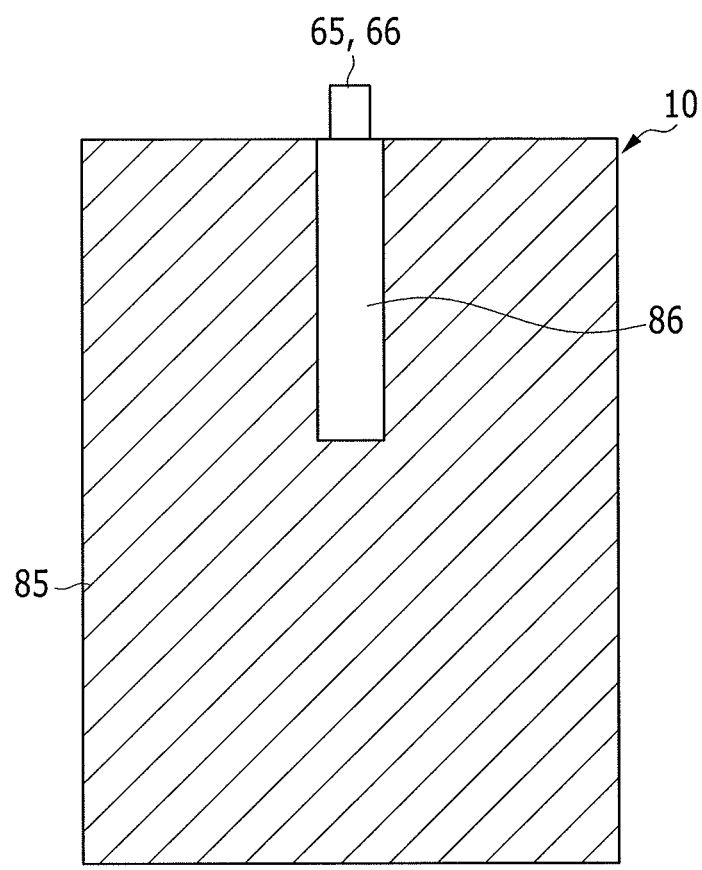
FIG. 20 is a side view showing a thermo-compressed electrode assembly according to the seventh example embodiment.

FIG. 19 is a perspective view showing a process of thermo-compressing an electrode assembly according to a seventh example embodiment and FIG. 20 is a side view showing a thermo-compressed electrode assembly according to the seventh example embodiment.

Referring to FIGS. 19 and 20, the electrode assembly according to the present example embodiment has a similar structure as the rechargeable battery according to the first example embodiment, other than the thermo-compressed structure and installed structure of the lead tabs, and therefore the description of same structure will not be repeated.

The electrode assembly 10 is formed to have a structure in which the positive electrode and the negative electrode are spiral-wound having the separator therebetween, and the electrode assembly 10 is provided with the positive electrode tab 65 and the negative electrode tab 66. The positive electrode tab 65 and the negative electrode tab 66 are both disposed at the center of the electrode assembly 10 in the width direction and both protrude to the same end of the electrode assembly 10. The positive electrode tab 65 and the negative electrode tab 66 are disposed to be overlapped in the width direction of the electrode assembly 10.

The electrode assembly 10 is thermo-compressed by a first pressing plate 75 and a second pressing plate 76. The first pressing plate 75 and the second pressing plate 76 are heated in advance and compress the electrode assembly 10, such that the positive electrode 11 and the negative electrode 12 are closely adhered to the separators 13 and 14.

A slit part 75a is formed in the first pressing plate 75, and the slit part 75a is formed at a position corresponding to each of the positive electrode tab 65 and the negative electrode tab 66. In addition, the second pressing plate 76 is formed of the same structure with the first pressing plate 75, a slit part 76a is formed in the second pressing plate 76, and the slit part 76a is formed at the position corresponding to each of the positive electrode tab 65 and the negative electrode tab 66.

Referring to FIG. 20, when the electrode assembly 10 is thermo-compressed by using the pressing plates 75 and 76, the electrode assembly 10 is provided with a pressing region 85 and a non-pressing region 86. The non-pressing region 86 is formed to overlap the end where the lead tabs 36 and 37 protrude at the center of the electrode assembly 10 in the width direction. The non-pressing region 86 extends in the length direction of the winding axis X1 from the end where the lead tabs 36 and 37 protrude to the opposite end, and the non-pressing region 86 is enclosed by the pressing region 85.

Figure 21:
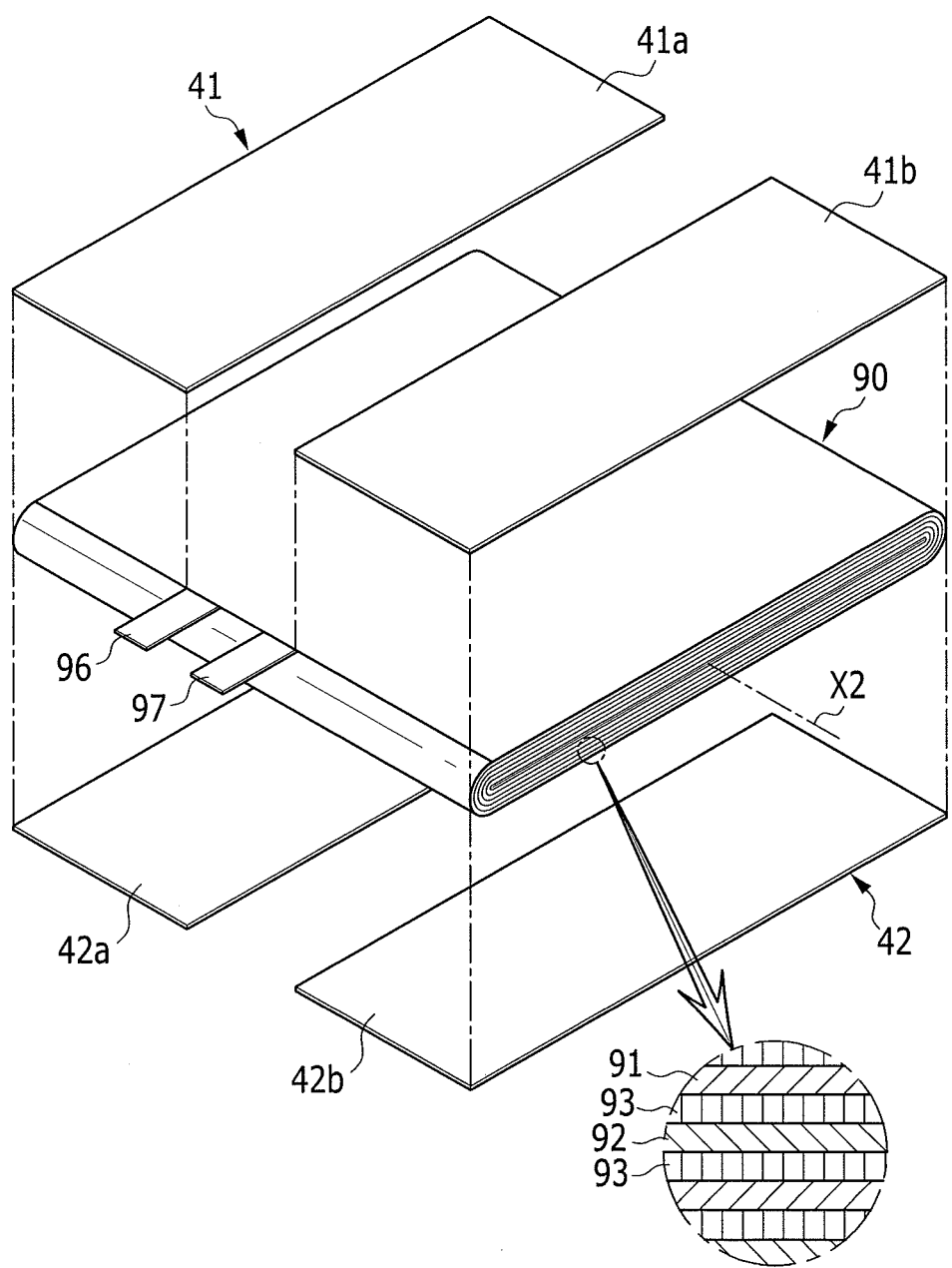
FIG. 21 is a perspective view showing a process of thermo-compressing an electrode assembly according to an eighth example embodiment.

FIG. 21 is a perspective view showing a process of thermo-compressing an electrode assembly according to an eighth example embodiment.

Referring to FIG. 21, the electrode assembly according to the present example embodiment has a similar structure as the rechargeable battery according to the first example embodiment, other than the thermo-compressed structure and the spiral-wound structure, and therefore the description of same structures will not be repeated.

The electrode assembly 90 is formed to have a structure in which the positive electrode 91 and the negative electrode 92 are spiral-wound having the separator 93 therebetween, and the electrode assembly 90 is provided with the positive electrode tab 96 and the negative electrode tab 97. In the present example embodiment, the electrode assembly has a cross-sectional portion, in which stacked layers are exposed, and an external peripheral surface wound therearound. The external peripheral surface includes a flat front surface part and a curved surface connecting the front surface parts.

The electrode assembly 90 according to the present example embodiment is provided with the positive electrode tab 96 and the negative electrode tab 97 installed therein. The positive electrode tab 96 and the negative electrode tab 97 are installed to protrude to the curved surface. In this case, the positive electrode tab 96 and the negative electrode tab 97 are protruded in a direction in which intersects with a winding axis X2 of the electrode assembly 90.

The electrode assembly 10 is thermo-compressed by a first pressing plate 41 and a second pressing plate 42. The first pressing plate 41 and the second pressing plate 42 are heated in advance and compress the electrode assembly 10, such that the positive electrode 11 and the negative electrode 12 are closely adhered to the separators 13 and 14.

In the present example embodiment, the first pressing plate 41 includes a first board 41a and a second board 41b spaced from the first board 41a. The first board 41a and the second board 41b are disposed more to the outside than the positive electrode tab 96 and the negative electrode tab 97, and the first board 41a and the second board 41b have the positive electrode tab 96 and the negative electrode tab 97 disposed therebetween.

In addition, the second pressing plate 42 has a same shape as the first pressing plate 41 and includes a first board 42a and a second board 42b spaced from the first board 42a. The first board 42a is spaced apart from the second board 42b by a predetermined interval. The first board 42a and the second board 42b have the positive electrode tab 96 and the negative electrode tab 97 disposed therebetween.

The electrode assembly 10 is provided with a pressing region which is compressed by the pressing plates 41 and 42 and a non-pressing region which is not compressed. The pressing region is formed laterally at both sides based on the width direction of the electrode assembly 10, respectively, the non-pressing region is formed between the pressing regions, and the non-pressing region is extended in a vertical direction to the winding axis X2.

By way of summation and review, a general rechargeable battery includes an electrode assembly including a positive electrode and a negative electrode and a separator interposed therebetween. The positive electrode and the negative electrode may be formed by applying an active material to a current collector made of metal, and the current collector may be provided with a coating region in which the active material is coated on the current collector and an uncoated region in which the active material is not coated thereon.

The electrode assembly may be spiral-wound and then thermo-compressed. In the thermo-compressed electrode assembly, strength may be increased, which may help maintain a shape from outer impact, and thickness of a cell may be decreased, which may help increase energy density per unit volume. In addition, the electrode assembly which the thickness of the cell is reduced caused by the thermo-compression may be more easily inserted into a case.

When impact acts on the case in a longitudinal direction, the electrode assembly may be broken, such that internal short-circuit may occur. Further, an interval between the electrodes of the electrode assembly caused by the thermo-compression may be reduced, such that electrolyte solution wetting performance is deteriorated.

As described above, embodiments may provide an electrode assembly and a rechargeable battery in which of safety with respect to a longitudinal compressive force is improved. According to embodiments, the electrode assembly may be provided with portions having the thickness and the flexibility different from each other. Thus, even though a longitudinal compressive force may act on the electrode assembly, it may resist damage and may be easily bent. The electrode assembly may be provided with a portion which is not thermo-compressed. Thus, the electrolyte solution wetting performance of the electrode assembly may be increased as compared with a portion which is thermo-compressed.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

DESCRIPTION OF SYMBOLS 10, 90: electrode assembly 100: rechargeable battery
11, 91: positive electrode 12, 92: negative electrode
13: the first separator 13a, 14a: ceramic layer
13b, 14b: polymer layer 13c, 13d: adhesive layer
14: the second separator 20: cap assembly
21: circuit board 21a: outer terminal
22: the first lead tab 23: the second lead tab
24: molding part 25: bonding part
28: sealing closure 36, 38, 65, 96: positive electrode tab
37, 39, 66, 97: negative electrode tab
41, 43, 45, 47, 71, 73, 75: the first pressing plate
41a, 42a, 45a, 46a, 71a, 72a, 73a, 74a: the first board
41b, 42b, 45b, 46b, 71b, 72b, 73b, 74b: the second board
42, 44, 46, 48, 72, 74, 76: the second pressing plate
43a, 44a, 75a, 76a: slit part 45c, 46c: the third board
47a, 48a: the first slit part 47b, 48b: the second slit part
47c, 48c: protrusion
51, 53, 55, 57, 81, 83, 85: pressing region
52, 54, 56, 58, 82, 84, 86: non-pressing region
60: case

What is claimed is:

1. An electrode assembly, comprising:
an electrode stack that includes a positive electrode, a negative electrode, and a separator, the separator being interposed between the positive electrode and the negative electrode;
a positive electrode tab projecting from an edge of the electrode stack; and
a negative electrode tab projecting from an edge of the electrode stack, wherein:
the electrode stack has a height direction, a width direction, and a thickness direction, the thickness direction being substantially perpendicular to a plane that includes the height and width directions, the electrode stack having a first thickness in the thickness direction at a first location corresponding to at least one of the positive and negative electrode tabs, the electrode stack having a second thickness in the thickness direction at a second location peripheral to the first location, the first thickness being greater than the second thickness, wherein:
the electrode assembly has a pressing region and non-pressing region, the second location being in the pressing region, the first location being in the non-pressing region, the pressing region being compressed so as to have a thickness that is less than that of the non-pressing region, the non-pressing region corresponding to at least one of the positive and negative electrode tabs.

2. The electrode assembly as claimed in claim 1, wherein the second location is approximately midway between the first location and an edge of the electrode stack.

3. The electrode assembly as claimed in claim 1, wherein:
the electrode stack has a first edge and a second edge, the first and second edges being spaced apart in the height direction,
the positive and negative electrode tabs project from the first edge, and
the electrode stack has the first thickness from substantially the first edge to the second edge.

4. The electrode assembly as claimed in claim 1, wherein:
the electrode stack has a first edge and a second edge, the first and second edges being spaced apart in the height direction,
the positive and negative electrode tabs project from the first edge,
the electrode stack has the first thickness from substantially the first edge to a first position between the first and second edges, and
the electrode stack has the second thickness from the first position to the second edge.

5. The electrode assembly as claimed in claim 1, wherein:
the electrode assembly has a first edge and second edge opposite to the first edge, and has opposing third and fourth edges that connect the first and second edges, the positive electrode tab projecting from the first edge, the negative electrode tab projecting from the second edge, and
the pressing region includes substantially all of the third and fourth edges.

6. The electrode assembly as claimed in claim 1, wherein:
the electrode assembly has a first edge and second edge opposite to the first edge, and has opposing third and fourth edges that connect the first and second edges, the positive and negative electrode tabs projecting from the first edge, and
the pressing region includes substantially all of the second, third, and fourth edges.

7. The electrode assembly as claimed in claim 1, wherein:
the electrode assembly has a first edge and second edge opposite to the first edge, and has opposing third and fourth edges that connect the first and second edges, the positive and negative electrode tabs projecting from the first edge, and
the pressing region includes substantially all of the third and fourth edges.

8. A rechargeable battery comprising the electrode assembly as claimed in claim 1.

9. A method of manufacturing an electrode assembly, the method comprising:
providing an electrode stack that includes a positive electrode, a negative electrode, and a separator, the separator being interposed between the positive electrode and the negative electrode, a positive electrode tab projecting from an edge of the electrode stack, a negative electrode tab projecting from an edge of the electrode stack; and
pressing the electrode stack in a second region that excludes a first region corresponding to at least one of the positive and negative electrode tabs so as to reduce a thickness of the electrode stack except in the first region, wherein:
the pressed electrode stack has a height direction, a width direction, and a thickness direction, the thickness direction being substantially perpendicular to a plane that includes the height and width directions, the pressed electrode stack having a first thickness in the thickness direction at a first location corresponding to at least one of the positive and negative electrode tabs, and having a second thickness in the thickness direction at a second location peripheral to the first location, the first thickness being greater than the second thickness, and
the second location is in the pressed second region, the first location being in the first region, the pressed second region being compressed so as to have a thickness that is less than that of the first region, the first region corresponding to at least one of the positive and negative electrode tabs.

10. The method as claimed in claim 9, wherein pressing the electrode stack includes applying pressure to the electrode stack using a pressing plate that has a slit part aligned with the at least one of the positive and negative electrode tabs.

11. The method as claimed in claim 10, wherein:
the pressing plate includes a first pressing plate provided at a first side of the electrode stack and a second pressing plate provided at a second side of the electrode stack, such that the electrode stack is between the first and second pressing plates, and
the first and second pressing plates each include a plurality of parts spaced apart by a slit part, the slit parts each overlapping an edge of the electrode stack, at least one of the positive and negative electrode tabs projecting from an edge of the electrode stack in a region corresponding to a slit part.

12. The method as claimed in claim 11, wherein the positive and negative electrode tabs each project from a same edge of the electrode stack.

13. The method as claimed in claim 11, wherein the positive and negative electrode tabs project from opposite edges of the electrode stack.

14. The method as claimed in claim 10, wherein:
the pressing plate includes a first pressing plate provided at a first side of the electrode stack and a second pressing plate provided at a second side of the electrode stack, such that the electrode stack is between the first and second pressing plates, and
the first and second pressing plates are each formed as a continuous plate that overlaps substantially all of a side of the electrode stack except for an open region formed by the slit part, the positive and negative electrode tabs each projecting from a same edge of the electrode stack in a region corresponding to the slit parts.

* * * * *